United States Patent Office 2,768,063
Patented Oct. 23, 1956

2,768,063

METHOD OF PREPARING SILICA

Joseph J. Domicone, Elmira, N. Y., assignor to Corning Glass Works, Corning, N. Y., a corporation of New York No Drawing. Application February 5, 1953,
Serial No. 335,383

3 Claims. (Cl. 23—182)

This invention relates to the preparation of silica and particularly to the precipitation in an aqueous medium of an easily filterable, finely divided amorphous silica suitable for producing a light-diffusing coating on the inner surface of a glass lamp bulb.

Various means have been utilized to eliminate the glare and to diffuse the light of lamps employing concentrated light sources, such as the incandescent electric lamp. To accomplish this purpose the inside-frosted or acid-etched glass bulb is widely used as an enclosure for such lamps. It does not, however, provide complete diffusion of the light of the filament and, while the filament itself is not visible through such a bulb, the light thereof is concentrated in its neighborhood and does not appear to fill the entire bulb. A more effective light-diffusing means whereby the entire bulb is filled with light is therefore desirable.

As described by James F. Hyde in pending application Serial No. 335,387 filed concurrently herewith, such a lamp bulb can be rendered more satisfactorily light-diffusing by flushing its inner surface with an aqueous suspension of a finely divided amorphous mixture comprising essentially silica and, in proportion to such silica, a small amount of the metal-containing reaction product resulting from the reaction in an aqueous medium of ammonia and a water-soluble compound selected from the group consisting of water-soluble compounds of magnesium, calcium, strontium and barium and mixtures of such compounds, and drying the deposited suspension. Silica obtained as a precipitate by reaction of ammonium silicofluoride with ammonia in aqueous solution is particularly suitable for use in such procedure. The particle size of such precipitated silica is difficult to control, however, and the silica precipitate also tends to be gelatinous in character and difficult to filter and wash.

I have now discovered that an easily filterable, finely divided, amorphous silica suitable for such purpose can be obtained from such reaction by rapidly introducing and mixing an aqueous solution of ammonium silicofluoride into an aqueous solution of ammonia containing at least ¼ mol more than the stoichiometric amount of $NH_3$ required by the following reaction:

the temperature of each solution before admixture being 25° to 37° C.

In carrying out the invention and by way of example, an aqueous solution of ammonium silicofluoride, advantageously in the proportion of about one mol per liter of water, is filtered to remove any insoluble matter; and the filtered solution at a temperature of 25° to 37° C. is mixed as rapidly as possible with a substantially equal volume of an aqueous solution of ammonia containing about 4¼ to 5 mols of $NH_3$ per liter of water, also at a temperature of 25° to 37° C. The temperature of each solution should preferably be within one degree of the other and most desirably about 31° to 32° C.

So as to ensure maximum precipitation of $SiO_2$, it is essential that the mixture should contain an excess of ammonia, the amount of the excess advantageously being between ¼ and 1 mol as is indicated above. Less than ¼ mol excess results in too large a proportion of gel and difficult filtration. While good results can be obtained with more than 1 mol excess $NH_3$, a larger excess is unnecessary and the fumes evolved, particularly with a concentrated solution, are very objectionable.

Mixing should be accomplished by pouring the ammonium silicofluoride solution as rapidly as possible into the ammonium solution while vigorously stirring the mixture. To reverse the order and pour the ammonia solution into the ammonium silicofluoride solution results in a too gelatinous precipitate tending to produce non-uniform coatings.

Since the heat generated by the reaction raises the temperature of the reaction mixture somewhat, it is desirable to cool the reaction mixture before filtering in order to avoid the formation of too great a proportion of gel, as by adding thereto about one liter of cold water (less than 20° C.) per mol of $SiO_2$.

In order to remove the byproduct ammonium fluoride and ammonia the precipitated silica is filtered and washed with cold water. Washing is advantageously accomplished by redispersing the filter cake in about one liter of water per mol of $SiO_2$ and refiltering the redispersed silica.

What is claimed is:

1. The method of making an easily filterable, finely divided, amorphous silica which comprises rapidly introducing and mixing an aqueous solution of ammonium silicofluoride into an aqueous solution of ammonia containing at least ¼ mol more than the stoichiometric amount of $NH_3$ required by the reaction

the temperature of each solution before admixture being 25° to 37° C.

2. The method of claim 1 in which the temperature of each solution is about 31° to 32° C. before admixture.

3. The method of making an easily filterable, finely divided, amorphous silica which comprises rapidly introducing and mixing an aqueous solution of about one mol of ammonium silicofluoride per liter of water into a substantially equal volume of an aqueous solution of 4¼ to 5 mols of $NH_3$ per liter of water, the temperature of each solution before admixture being 31° to 32° C.

References Cited in the file of this patent

UNITED STATES PATENTS

| | | |
|---|---|---|
| 1,859,998 | Svendsen | May 24, 1932 |
| 1,903,187 | McClenahan | Mar. 28, 1933 |
| 1,959,748 | Svendsen | May 22, 1934 |
| 1,959,749 | Svendsen | May 22, 1934 |

OTHER REFERENCES

Mellor: "Comprehensive Treatise on Inorganic and Theoretical Chemistry," vol. 6, 1925, page 946.